July 15, 1930.  J. E. MITCHELL  1,770,544
COMBINED COTTON RECLEANER AND GIN
Filed June 15, 1929
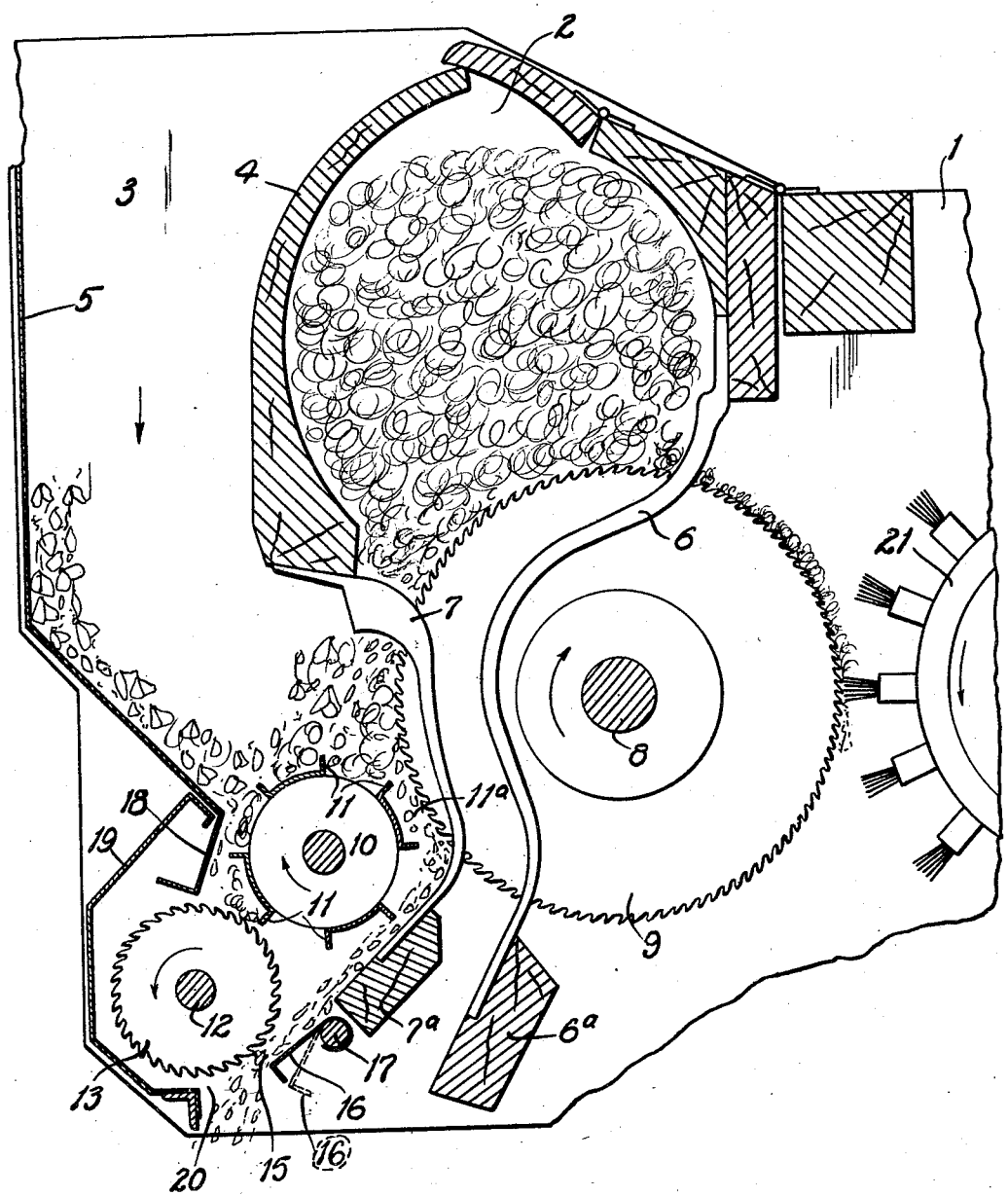
INVENTOR:
JOHN E. MITCHELL.
BY Bruce S. Elliott
ATTORNEY.

Patented July 15, 1930

1,770,544

UNITED STATES PATENT OFFICE

JOHN E. MITCHELL, OF DALLAS, TEXAS

COMBINED COTTON RECLEANER AND GIN

Application filed June 15, 1929. Serial No. 371,114.

The general object of this invention is to provide an improved cotton gin which is, in effect, a combined cotton gin, cotton cleaning and separating machine, and the invention is directed to the application of cotton cleaning and separating mechanism in the breast of the huller type of cotton gins.

In the embodiment of my invention shown in the drawing, the improvements are illustrated as applied to a cotton gin of the double-rib type, but they may equally well be applied to gins equipped with single huller ribs.

The invention is more particularly directed to improvements in the type of machine described and illustrated in my prior Patent No. 1,707,131, dated March 26th, 1929, and in common with the machine of this patent, is designed to overcome the objection inherent in the construction of the modern huller-rib cotton gins of either the single or double-rib type, in which a picker roller is located in the lower portion of the huller breast, so that the cotton fed into the huller breast falls on this picker roller and is thrown over into contact with the gin saws which extend through the huller ribs into the huller breast.

This picked roller is adjustable to and from the gin saws, with the idea of providing just enough space between the roller and the saws to permit the hulls, sticks and other trash contained in the cotton to escape through the space between the roller and the saws and be discharged from the bottom of the huller breast while the gin saws engage the cotton and carry it through the huller ribs into the roll-box.

As fully pointed out in the specification of my prior patent aforesaid, it has been found impossible to secure an ideal adjustment of the picker roller relative to the huller ribs, for the reason that if the picker roller is adjusted far enough away from the gin saws to permit a free discharge of the hulls and trash, a considerable percentage of the small-lock cotton will also escape with the hulls and trash; on the other hand, if the roller is positioned close enough to the saws to prevent the loss of too much cotton, there results an inevitable accumulation of foreign matter in the huller breast above the picker roller which is constantly forced into contact with the rapidly revolving gin saws, resulting in chipping or cutting the hulls and sticks and in a considerable portion of the foreign matter being worked through the huller ribs into the gin roll, whence it cannot escape and where it is subjected to still further cutting action of the gin saws, resulting in a lowering of the quality of staple obtained from the gin.

The machine disclosed in the patent above referred to was entirely successful in bring about a rapid and free discharge of the hulls and trash from the huller breast, but in operation, certain mechanical difficulties were encountered due to the fact that the re-cleaning saw cylinder and the combined doffer and feed roller above it are mounted inside the huller breast, with the recleaning saw rotating in the same direction as the gin saws. In this arrangement, substantially all of the mixed cotton and trash delivered into the breast of the gin falls directly onto the re-cleaning saw cylinder and the roller or doffer above it throws the cotton from the top of this cylinder across an intervening gap and onto that portion of the gin saws extending through the huller ribs into the breast.

The objection to this construction is that as the re-cleaning saw cylinder has to handle all of the cottom fed into the breast of the gin, unless the stream of mixed cotton and hulls is uniform, or in case of a sudden or heavy overload, the mass is liable to wedge between the small reclaiming saw cylinder and the doffer roll, thus clogging or stopping the operation of these two members.

I overcome this objection in the present invention by mounting a reclaiming saw cylinder entirely outside of the huller breast proper, or that portion of it into which the cotton is exposed to the action of the gin saws extending into the breast; by mounting a roller, corresponding in function to the doffer roll of my prior patent referred to, in the bottom of the huller breast in substantially the same position as the conventional picker roller and at such a distance from the gin saws as to permit of the free discharge of hulls and trash past the saw cylinder; and by causing the reclaiming saw cylinder to rotate in the opposite direction to that of the gin saw cylinder and said co-operating roller to rotate in the same direction as the gin saw cylinder and, therefore, in a direction opposite to that of the rotation of the reclaiming saw cylinder. As thus arranged, these elements co-operate to effect the cleaning of the cotton with the same efficiency as characterized the machine of my prior patent; insures the rapid and free discharge of hulls and trash from the machine without loss of cotton; and avoids the danger of clogging due to overloading, or to lack of uniformity in the stream of mixed cotton and hulls fed into the machine which is present in the machine of my prior patent.

My invention is, therefore, characterized by the above described arrangement and operation of parts in a huller rib cotton gin and will now be described in detail.

In the accompanying drawing—

The figure is a longitudinal sectional view partly broken away through a machine constructed according to my invention.

Referring now to the drawing, the numeral 1 indicates the casing of a gin, in which casing is provided a roll-box 2 and a breast 3 formed by one wall 4 of the roll-box and the front wall 5 of the casing. Depending from the rear side of the roll-box is a series of ginning ribs 6 and depending from the front wall of the roll-box is a series of huller ribs 7. The lower ends of the ginning ribs 6 are mounted on a transverse frame bar 6ª and the lower ends of the huller ribs 7 are located on a transverse frame bar 7ª. Mounted in suitable bearings in the end walls of the casing 1 is a gin saw cylinder the shaft of which is indicated at 8 and one of the saws whereof is indicated at 9. The above parts are of ordinary construction and are practically standard in the modern type of double-rib gin. To make the present invention clear, it may be further stated, however, that the huller ribs 7 are spaced a sufficiently wide distance apart to permit the seeds to be drawn through the spaces between them by the gin saws, while, at the same time, such spaces are narrow enough to preclude the passage of hulls, trash and the like, which latter are thereby separated from the cotton as the latter is drawn through the spaces between the huller ribs by the saws and are removed from the gin in a manner to be presently described. The ginning ribs 6 extend through the spaces between the saws and each pair of ribs is positioned in close proximity to the sides of one of the gin saws so as to prevent the seeds from being drawn through the spaces between these ribs as the cotton is carried through by the saws. As they are separated from the cotton, the seeds slide down the outer or front faces of the ribs 6 and fall out of the machine.

To accomplish the purposes of my invention, I mount in the lower portion of the breast of the gin a combined doffer and feed roller 10 which is positioned to rotate in proximity to the gin saws at the points where the latter pass through the spaces between the huller ribs 7, and in the same direction as the gin saws. That is to say, the opposed surfaces of the roller and gin saws move in opposite directions. The roller 10, in its preferred form, comprises a cylinder having a series of blades 11 secured about its periphery at suitable distances apart and extending longitudinally of the cylinder. This roller is mounted in fixed bearings far enough away from the gin saws to provide a space 11ª between the roller and the saws wide enough to insure a free or quick discharge of the hulls and trash from the breast of the gin. The width of this space is such that a certain percentage of the small-lock cotton will also be discharged through it along with the hulls and trash. To prevent the waste or loss of this cotton, I rotatably mount in the end walls of the casing 1 beneath the roller 10 and entirely outside of the huller breast a reclaiming saw cylinder the shaft of which is indicated at 12 and one of the saws whereof is indicated at 13. This reclaiming saw cylinder, as in the case of the gin saw cylinder, comprises a series of circular saws suitably spaced apart throughout the length of the cylinder. The reclaiming saws, however, are of much less diameter than the gin saws. The driving mechanism for the rotatable parts referred to is not shown, but it is of the conventional kind and so arranged as to drive the gin saws, the roller 10 and the reclaiming saws in the respective directions shown by the arrows, that is to say, the gin saws and the roller 10 revolving in the same direction and the reclaiming saw cylinder in an opposite direction, or counterclockwise. The exact speeds of rotation of these parts are not important, but it is important that the roller 10 should have a higher surface speed of rotation than the reclaiming saw cylinder 13. The usual R. P. M. of the reclaiming saws is from 100 to 150; and of the roller 10, from 250 to 350. As saw cylinder 13 rotates in the opposite direction to that of both this roller and the gin saws, the hulls and trash containing a percentage of small-lock cotton are thrown against the upward moving teeth of the reclaiming saw cylinder, which engages the cotton while the hulls and trash are discharged through the space or opening 15. The discharge opening 15 is defined by one side of the reclaiming saw cylinder 13 and a valve 16 mounted on a transverse rod 17, the valve, as indicated by dotted lines, being adjustable to change the size of opening 15 to meet any requirements.

While the roller 10, as above stated, is mounted in substantially the same position as the picker roller used in the modern huller breast gin, the roller in this case does not have spikes or pins, but is provided with the blades or vanes 11, which serve the same purpose as the spikes of the picker roller in receiving the cotton delivered into the breast of the gin, and throwing it over into contact with the gin saws; but the blades 11 also serve the purpose of doffing the cotton from the reclaiming saws 13 and carrying it back into the breast of the gin, where it is again brought into contact with the gin saws. When the blades of roller 10 doff the locks of cotton from the reclaiming saws, the cotton is first thrown against an inclined deflector 18 which may be formed by suitably shaping the lower end of the front wall 5 of the casing, as shown, and from this deflector the cotton glances back into contact with the blades, which force it up into the breast of the gin.

The numeral 19 indicates a casing member which surrounds the outer side of the reclaiming saws 13 and the lower edge portion of which defines, with the lower edge portion of valve 16, an opening 20 for the escape of hulls and trash passing through opening 15 from the machine.

A distinguishing feature of the invention is in having roller 10 constructed and mounted in a manner to have it perform the several functions essential to making the huller breast feature of the modern gin thoroughly practicable. With this roller rotating in the same direction as the gin saws, it serves the purpose, in the upper half of its cycle of rotation, of receiving the mixed cotton and trash fed into the machine and forcing this product over into contact with the gin saws, while at the same time, in the lower half of its cycle of rotation, it throws the trash with the comparatively small percentage of cotton mixed with it into contact with the surface of the reclaiming saws 13; and, finally, it doffs from the reclaiming saw cylinder the cotton recovered by it, as stated above.

It will readily be seen that the present invention, while employing the same elements as the machine of my patent above referred to, differs essentially therefrom in that the roller 10 and reclaiming saws 13 rotate in opposite directions from that in which they are shown to rotate in my prior patent, and in the further fact that the reclaiming saw cylinder of the present invention functions for the purpose of reclaiming or recovering the comparatively small percentage of the cotton discharged from the breast of the gin with the hulls and trash, whereas in the machine of the patent, this small saw cylinder had to handle all of the cotton fed into the breast of the gin. As to the roller 10, it will also be seen that whereas in the machine of my prior patent, this roller operated to force the mixed cotton and hulls in the breast downwardly into engagement with the saws 13 and to doff cotton from said saws and throw the same into engagement with the gin saws, in the present invention, the roller 10 operates to prevent the mixed cotton and hulls in the breast from coming into engagement with the reclaiming saws 13, and forces the same into engagement with the gin saws in its upper portion, while in its lower portion, it throws the hulls and trash containing a percentage of small-lock cotton passing by the gin saws or through space $11^a$ against the upwardly moving teeth of the reclaiming saws and thereafter doffs from the reclaiming saws the cotton carried up thereby and returns same to the breast of the gin.

The operation of the machine has been clearly set forth during the course of the foregoing description, and it only remains to be stated that the cotton carried up by the gin saws 9 between the huller ribs 7, enters the roll-box 2 and is drawn between the ginning ribs 6 in the usual manner, being thereafter doffed from the gin saws by a doffer 21 in the usual way.

I claim:

1. In a huller rib gin, in combination with the breast of the gin, into which the cotton mixed with hulls and trash is adapted to be fed, and with the gin saws, operating, in part, in said breast, cleaning mechanism comprising a cotton reclaiming saw cylinder located outside of the huller breast, and a roller located in the lower portion of the huller breast in co-operative relation with said gin saws and said reclaiming saw cylinder, and functioning to feed the raw product fed into the breast to the gin saws and to doff cotton from the reclaiming saws and return same to the huller breast.

2. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast, and a roller located in the lower portion of the huller breast rotating in the same direction as the gin saws and functioning to feed the raw product to the gin saws, to project cotton, hulls and trash passing by the gin saws onto the reclaiming saws, and to doff cotton from the reclaiming saws and return same to the huller breast.

3. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast, and a roller located in the lower portion of the huller breast rotating in the same direction as the gin saws and functioning in its upper portion to feed the raw product to the gin saws and in its lower portion to project cotton, hulls and trash passing by the gin saws onto the reclaiming saws, and to doff cotton from the reclaiming saws and return same to the huller breast.

4. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast rotating in the opposite direction to that of the gin saws, and a roller located in the lower portion of the huller breast rotating in the same direction as the gin saws and functioning in its upper portion to feed the raw product to the gin saws and in its lower portion to project cotton, hulls and trash passing by the gin saws onto the reclaiming saws, and to doff cotton from the reclaiming saws and return same to the huller breast.

5. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast rotating in a direction opposite to that of the gin saws, and a roller located in the lower portion of the huller breast rotating in the same direction as the gin saws in a zone between the latter and the reclaiming saws and functioning in its upper portion to feed the raw product to the gin saws and in its lower portion to project cotton, hulls and trash passing by the gin saws onto the reclaiming saws, and to doff cotton from the latter and return same to the huller breast.

6. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast rotating in a direction opposite to that of the gin saws, and a roller located in the lower portion of the huller breast rotating in the same direction as the gin saws and functioning in its upper portion to receive the raw product fed into the breast and to feed it to the gin saws, and in its lower portion to project cotton, hulls and trash passing by the gin saws onto the surface of the reclaiming saws, and to doff cotton from the latter and return same to the huller breast.

7. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast and rotating in a direction opposite to that of the gin saws, and a roller located in the lower portion of the huller breast in a zone between the gin saws and reclaiming saws, rotating in the same direction as the gin saws, and substantially filling the outlet or throat of the huller breast, said roller functioning in its upper portion to receive the raw product fed into the breast and to feed the same to the gin saws and in its lower portion to project cotton, hulls and trash passing by the gin saws onto the reclaiming saws in the lower portion thereof, and to doff cotton from the upper portion of said reclaiming saws and return it to the huller breast.

8. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast rotating in a direction opposite to that of the reclaiming saws, and a roller located in the lower portion of the huller breast rotating in the same direction as the gin saws and separated therefrom a sufficient distance to provide a space adequate for the free escape of hulls, trash and small-lock cotton past the gin saws and functioning in its upper portion to receive the raw product fed into the breast and to feed it onto the gin saws, and in its lower portion to project the cotton, hulls and trash escaping past the gin saws onto the reclaiming saws in the lower portion thereof, and to doff cotton from the upper portion of said reclaiming saws and return same to the huller breast.

9. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast rotating in a direction opposite to that of the gin saws, and a roller located in the lower portion of the huller breast in a zone between the gin saws and reclaiming saws and separated from the gin saws a distance sufficient to provide a space adequate for the free escape of hulls, trash and small-lock cotton past the gin saws, said roller functioning in its upper portion to receive the raw product fed into the breast and to feed it onto the gin saws, and in its lower portion to project the cotton, hulls and trash passing by the gin saws onto the reclaiming saws in the lower portion thereof, and to doff cotton from the upper portion of said reclaiming saws and return same to the huller breast gin, the construction providing an opening past the lower portion of the reclaiming saws for the escape of hulls and trash from the machine.

10. In a huller rib gin, in combination with the breast of the gin, into which the cotton mixed with hulls and trash is adapted to be fed, and with the gin saws, cleaning mechanism comprising a cotton reclaiming saw cylinder located outside of the huller breast rotating in a direction opposite to that of the gin saws, a roller located in the lower portion of the huller breast between the gin saws and the reclaiming saws rotating in the same direction as the latter, said roller functioning in its upper portion to receive the raw product fed into the breast and to feed it onto the gin saws, and in its lower portion to project cotton, hulls and trash passing by the gin saws onto the reclaiming saws in the lower portion thereof, and to doff cotton from the upper portion of the reclaiming saws and return same to the huller breast, and a deflector located adjacent to said roller at the side thereof remote from the gin saws and against which the cotton doffed from the reclaiming saws is thrown by said roller and is caused to glance back onto the surface thereof.

In testimony whereof, I have hereunto set my hand.

JOHN E. MITCHELL.